United States Patent
Coppola et al.

(10) Patent No.: US 10,155,547 B1
(45) Date of Patent: Dec. 18, 2018

(54) VASCULAR STRUCTURES AND METHODS FOR HEAT MANAGEMENT

(71) Applicant: GM GLOBAL TECHNOLOGY OPERATIONS LLC, Detroit, MI (US)

(72) Inventors: Anthony M. Coppola, Rochester Hills, MI (US); Michelle H. Wiebenga, Farmington Hills, MI (US); Fang Dai, Troy, MI (US); Derek F. Lahr, Howell, MI (US); Rashmi Prasad, Troy, MI (US); Ryan Gergely, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/705,575

(22) Filed: Sep. 15, 2017

(51) Int. Cl.
*B62D 25/12* (2006.01)
*B60R 16/08* (2006.01)

(52) U.S. Cl.
CPC .............. *B62D 25/12* (2013.01); *B60R 16/08* (2013.01)

(58) Field of Classification Search
CPC ...... B62D 25/07; B62D 25/10; B62D 25/105; B62D 25/12; B60K 11/04
See application file for complete search history.

(56) References Cited

U.S. PATENT DOCUMENTS

| 2,489,751 A | * | 11/1949 | Candler, Jr. | ............. B60H 1/00 126/569 |
| 2008/0257525 A1 | * | 10/2008 | Ohnishi | ................ B64G 1/506 165/41 |

OTHER PUBLICATIONS

Dong, H., et al. "Chemical Treatment of Poly(lactic acid) Fibers to Enhance the Rate of Thermal Depolymerization", ACS, Applied Materials & Interfaces, 2012, pp. 503-509, vol. 4.
Esser-Kahn, A. P., et al. "Three-Dimensional Microvascular Fiber-Reinforced Composites", Advanced Materials, 2011, pp. 3654-3658, vol. 23.

* cited by examiner

*Primary Examiner* — Erez Gurari
(74) *Attorney, Agent, or Firm* — Lorenz & Kopf, LLP

(57) ABSTRACT

Systems and methods are provided for heat management using vascular channels. Vascular channels are incorporated in a network within a component. The component is a part of a manufactured product and defines an exterior panel. A fluid circuit is connected with the vascular channels and circulates a fluid through the component to collect heat from the product and to dissipate heat through the exterior panel.

17 Claims, 13 Drawing Sheets

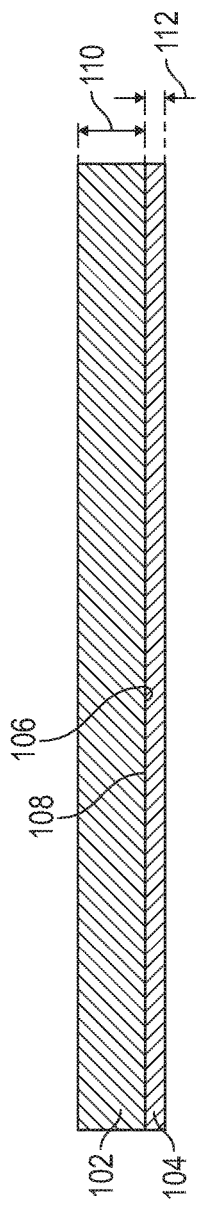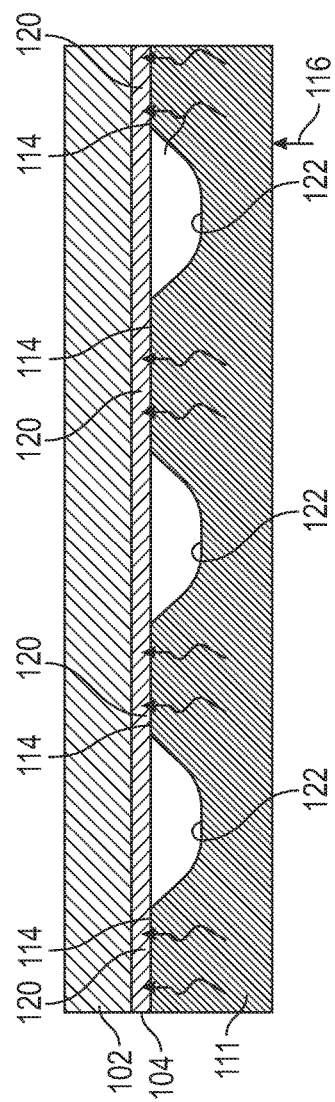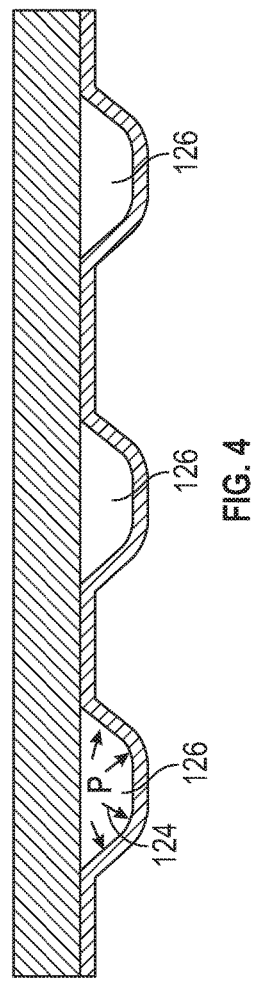

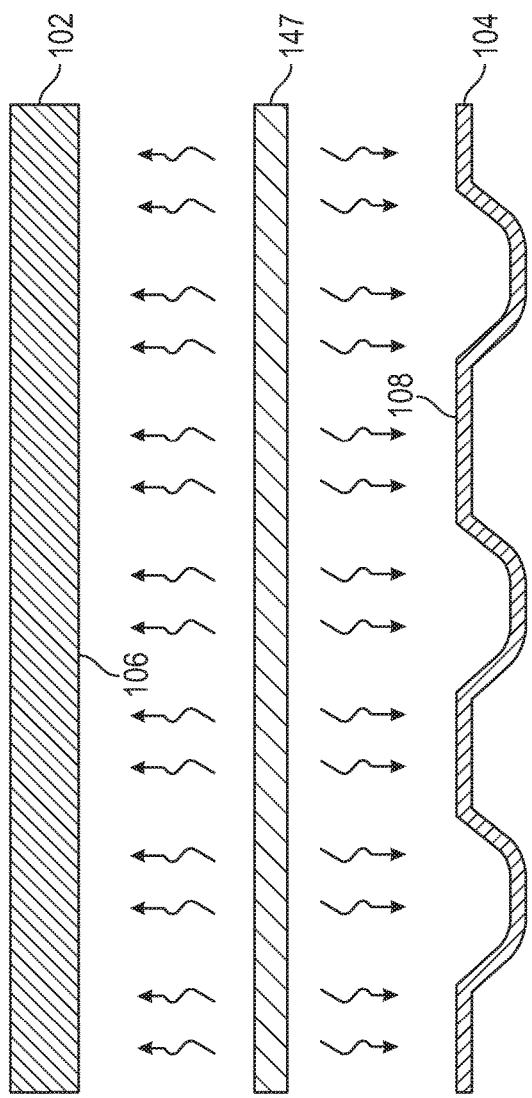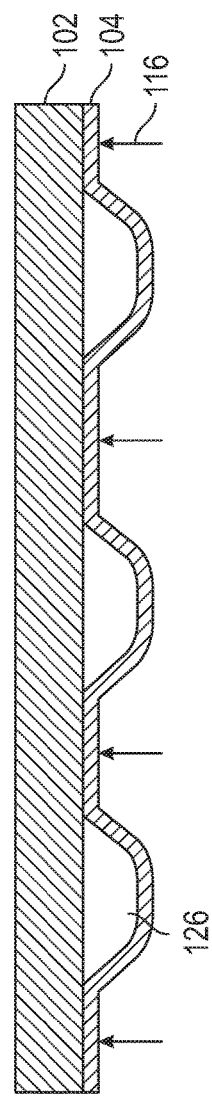

VASCULAR STRUCTURES AND METHODS FOR HEAT MANAGEMENT

INTRODUCTION

The present disclosure generally relates to structures and methods for heat management using vascular channels and more particularly, relates to cooling and/or heat dissipation through vascular channels formed in components such as exterior panels.

Assembled products may include components made of various different shapes and materials. The individual components may generate or contain heat that requires management. For example, a power source generates heat when delivering power that is preferably transferred away and dissipated to the environment. Systems that remove heat or provide cooling may themselves draw power lowering overall efficiency of the product. These systems may also add weight that is preferably avoided, particularly in mobile applications such as vehicles.

Accordingly, it is desirable to provide structures, systems and methods that effectively manage heat for a broad range of applications. Furthermore, other desirable features and characteristics of structures, systems and methods for cooling and/or heat dissipation will become apparent from the subsequent detailed description and the appended claims, taken in conjunction with the accompanying drawings and the foregoing technical field and background.

SUMMARY

Systems and methods are provided for heat management using vascular channels. In various exemplary embodiments, vascular channels are incorporated in a network within a component configured as an exterior panel of a manufactured product. A fluid circuit is connected with the vascular channels and is configured to circulate a fluid through the component. The fluid collects heat, which is dissipated through the component.

In additional embodiments, the manufactured product includes a vehicle and the component includes an exterior panel of the vehicle.

In additional embodiments, the fluid circuit includes a heat exchanger and a vehicle system. A pump is configured to circulate the fluid through the vehicle system, the heat exchanger and the component to cool the vehicle system.

In additional embodiments, the component includes a vehicle hood or a vehicle roof.

In additional embodiments, the vascular channels have a diameter between 0.5 millimeter and 5.0 millimeters.

In additional embodiments, the vascular channels include tubes embedded in the component.

In additional embodiments, the network includes a manifold connected with the vascular channels.

In additional embodiments, the component includes a fiber material incorporated in a polymer matrix.

In additional embodiments, the manufactured product includes a vehicle defining a cabin that is configured to carry occupants. An interior component defines part of an interior of the cabin. Vascular channels are also incorporated in a network in the interior component. A pump is configured to circulate the fluid through the network of the exterior panel and through the network of the interior component. Heat is collected from the interior component and is dissipated through the exterior panel.

In a number of other embodiments, a method for thermal management includes incorporating vascular channels in a network within a component. The component may be an exterior panel assembled as a part of a manufactured product. Heat is generated in a system of the manufactured product. A fluid circuit is connected with the vascular channels and the system. A fluid is circulated through the system and through the component to collect heat from the system and dissipate it through the component.

In additional embodiments, a method includes configuring the manufactured product as a vehicle and configuring the system to provide a function of the vehicle.

In additional embodiments, a method includes connecting a heat exchanger in the fluid circuit and circulating the fluid through the heat exchanger and through the network.

In additional embodiments, a method includes configuring the component as a vehicle hood or as a vehicle roof.

In additional embodiments, a method includes forming the vascular channels with a diameter between 0.5 millimeter and 5.0 millimeters.

In additional embodiments, a method includes forming the vascular channels as tubes and embedding the tubes in the component.

In additional embodiments, a method includes connecting a manifold with the vascular channels and incorporating the manifold into the component.

In additional embodiments, a method includes forming the component of a fiber material incorporated in a polymer matrix.

In a number of additional embodiments, a heat management system for a vehicle includes a component that defines an exterior panel of the vehicle. A fluid circuit is configured to circulate a fluid. A vascular channel is defined in the component and is connected with the fluid circuit so that the vascular channel is configured to channel the fluid through the component. A heat exchanger is carried by the vehicle and is configured to cool a system of the vehicle. The fluid circuit is configured to circulate the fluid through the system to collect heat, through the heat exchanger to dissipate heat, and also through the exterior panel to dissipate heat.

BRIEF DESCRIPTION OF THE DRAWINGS

The exemplary embodiments will hereinafter be described in conjunction with the following drawing figures, wherein like numerals denote like elements, and wherein:

FIG. 2 is a schematic cross section illustration of a component, in accordance with an embodiment;

FIG. 3 is a schematic cross section illustration of the component of FIG. 2 with an applied die, in accordance with an embodiment;

FIG. 4 is a schematic cross section illustration of the component of FIG. 2 with formed vascular channels, in accordance with an embodiment;

FIG. 11 is a schematic cross sectional illustration of a component heating operation, in accordance with various embodiments;

FIG. 12 is a schematic illustration of the component of FIG. 11 with formed vascular channels, in accordance with an embodiment;

DETAILED DESCRIPTION

Figure 1:
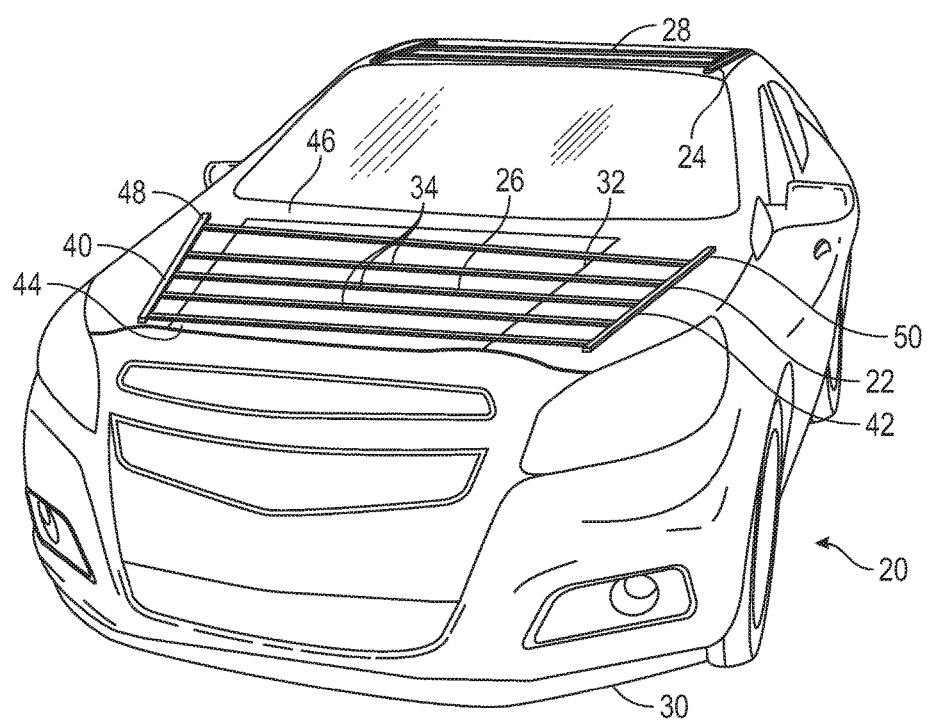
FIG. 1 is an illustration of a vehicle with panels that have vascular channels, in accordance with an embodiment.

The following detailed description is merely exemplary in nature and is not intended to limit the subject matter of the application or its uses. Furthermore, there is no intention to be bound by any expressed or implied theory presented in the preceding introduction, summary or the following detailed description.

In products that generate or contain heat, cooling and/or dissipation of heat to the environment is beneficial. In accordance with preferred embodiments described herein, the heat load of a manufactured product is managed by the incorporation of vascular channel fluid circulation structures, systems and methods for certain components. In exemplary embodiments, the vascular channels range in size, which depends on the application and the manufacturing method selected to form a component. Generally, the vascular channels range in size from 0.5 millimeter to five millimeters in diameter, although other sizes may be used. Cooling may be provided through the collection and/or dissipation of heat through the vascular channels. Excess heat, such as from solar loading, propulsion systems, battery systems, electronic systems and various other functional vehicle systems may be extracted and dissipated to the environment. Vascular channel cooling and/or heat dissipation may be used to supplement a cooling system, an HVAC system, or other systems and enables reducing the size of energy consuming components and systems, increasing efficiency. Size and weight reductions are also enabled for various systems that are used to dissipate heat such as an engine radiator, an air conditioning condenser, a transmission cooler and a battery cooler. These aspects are useful in all applications including electric vehicle applications.

Accordingly, the following description relates to vascular structures, systems and methods for thermal management. The structures, systems and methods may be described in the context of vehicular applications for purposes of demonstrating an example. A vehicle is but one type of manufactured product where vascular channel cooling and/or heat dissipation may be implemented. The present disclosure is not limited to vehicle applications, but rather, also encompasses any application where thermal management is desired and where components exist for the application of vascular channels. Accordingly, the teachings of the present disclosure can be applied to vehicles or to other applications, as desired.

In an exemplary embodiment, a vehicle may generate heat in its propulsion system, transmission, battery system, and other systems, and excess heat may be preferably removed from interior components and/or cabin air. Radiative sources such as those that surround the occupant including the windshield/windows, visor, dashboard, door panels, seats, flooring, and others, may be cooled through vascular channels in interior components that collect heat, and the heat may be dissipated through vascular channels in exterior components such as body panels. Accordingly, heat is removed from the vehicle or its systems and dissipated to the atmosphere.

In an example as illustrated in FIG. 1, a vehicle 20 includes components such as a hood 22 and roof panel 24 that include networks 26, 28 respectively, which are vascular channel networks. The networks 26, 28 are incorporated into the hood 22, roof panel 24, and/or other components on the exterior surfaces of the vehicle 20, including at the underbody 30, using one of the methods described below. The components, such as the hood 22 and the roof panel 24 may be made from a variety of materials as further described below. The components, such as the hood 22 and roof panel 24 are shaped to fit their design space and functional requirements of the vehicle 20, and may include varying surfaces such as contoured surface 32. It will be appreciated that the networks 26, 28 are shown in FIG. 1 for description purposes but in application will be embedded, such as under the surface 32, without read-through. Within the constraints of the shape of the components such as the hood 22 and roof panel 24 and their features, the networks 26, 28 are laid out to use the available space and to provide the necessary area to dissipate the collected unwanted heat. The network 26, as an example, includes a number of channels 34, which in this embodiment generally run from the side 36 to the side 38 of the hood 22. The channels 34 are connected with a manifold 40 and a manifold 42 that run in a direction from the front 44 to the rear 46 respectively, of the hood 22. A fluid may be circulated through the network 26, such as by being pumped into the manifold 40 at an inlet 48. From the inlet 48 the fluid travels through the manifold 40, the channels 34 and the manifold 42, which it exits at outlet 50. The fluid may dissipate heat into the hood 22 and therethrough, to the air flowing over the hood 22. In the exemplary embodiment with an air temperature of 25 degrees Celsius and a hood temperature of eighty degrees Celsius, when the vehicle 20 is traveling at one mile-per-hour, the hood 22 with vascular channel network 26 dissipates 1649 watts. The heat is dissipated through forced convention, natural convention, and radiation. When the vehicle 20 is traveling at thirty miles-per-hour, the hood 22 dissipates 3162 watts. The increase with increased vehicle speed is predominately in forced convention transfer.

A number of embodiments involve manufacturing of vascular channels by direct formation of channels in a multi-layer component with selective localized bonding. With reference to FIG. 2-4, two layers are situated against one another. One of the layers may take the form of a component 102 for which heating or cooling is action desired. For example, the component 102 may be an interior panel of a cabin, a seating surface, a part of a floor, wall or ceiling, or another type of component. The component 102 may be formed from any of a variety of materials including metal, polymer, composite or others. Generally, the component will be formed in its final shape at this stage, however in some embodiments, the component 102 may be subjected to further changes in form at a later stage. The second layer may take the form of a deformable sheet 104. As shown in FIG. 2, the component 102 and the deformable sheet 104 are placed together with a surface 106 of the component 102 against a surface 108 of the deformable sheet 104. The deformable sheet 104 may cover the entire surface 106, or may only cover a portion of the surface 106. In a number of embodiments, the component 102 may have a thickness 110 that is consistent. In other embodiments the thickness 110 varies over the area of the component 102. The deformable sheet 104 generally has a consistent thickness 112 that is less than the thickness 110.

As shown in FIG. 3, a tool, which in this example takes the form of a die 111, is brought into contact with the deformable sheet 104. The die 111 has raised areas 114 push the contacted areas of the deformable sheet 104 against the component 102 under the application of a force 116. In the interface areas 120, which correspond to the locations of the raised areas 114, the surface 108 is forced against the surface 106. The interface areas 120 may be selectively covered with an adhesive on the surface 108 and/or the surface 106. Application of the force 116 secures the deformable sheet 104 to the component 102 at the interface areas 120. In other embodiments, the die 111 is heated and the deformable sheet 104 is fused to the component 102 at the interface areas 120. The die 111 includes a number of depressions 122 between the raised areas 114. The pattern of the depressions 122 defines the channels that will be formed through the joined component 102 and deformable sheet 104. With reference to FIG. 4, a pressure 124 is applied between the surfaces 106 and 108 to open passages between the interface areas 120 forming channels 126. The deformable sheet 104 may be plastically deformed under action of the pressure 124 leaving the channels 126 open. In other embodiments, the channels 126 are filled with fluid while the pressure 124 is applied and the fluid is left in the channels 126, without plastic deformation of the deformable sheet 104. In still other embodiments, the deformable sheet is elastic and the channels are inflated when a fluid is circulated through them when in use in the application.

Figure 5:
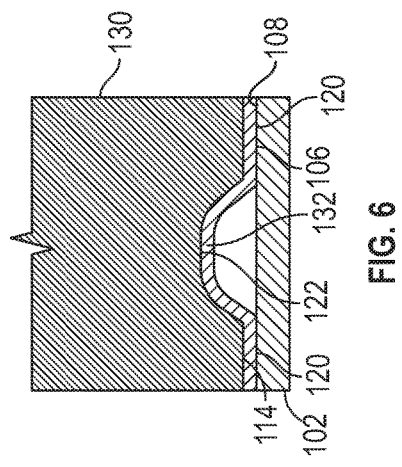
FIG. 5 is a schematic illustration of a sheet application process for a component, in accordance with an embodiment.
Figure 6:
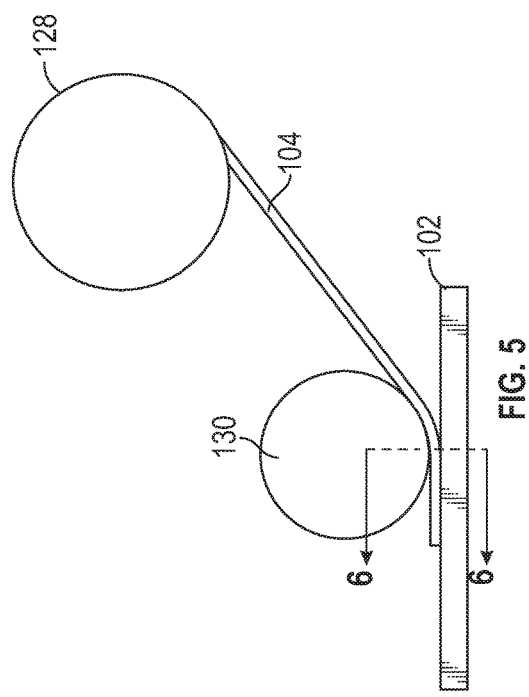
FIG. 6 is a schematic cross sectional illustration taken generally through the line 6-6 of FIG. 5, in accordance with an embodiment.

In an exemplary embodiment as illustrated in FIGS. 5-6, the deformable sheet 104 is applied to the component 102 through a roll-on operation. The deformable sheet 104 is fed from a roll 128 onto the component 102. A roller 130 forces the deformable sheet 104 against the component 102 at the interface areas 120. The roller has raised areas 114 with depressions 122 formed between them. The surface 108 is secured to the surface 106 at the interface areas 120 through an adhesive, or under the application of heat from the roller 130. In a number of embodiments, the deformable sheet 104 is pre-deformed with ridges 132 that fit within the depressions 122, obviating the need for pressurized deformation.

Figure 7:
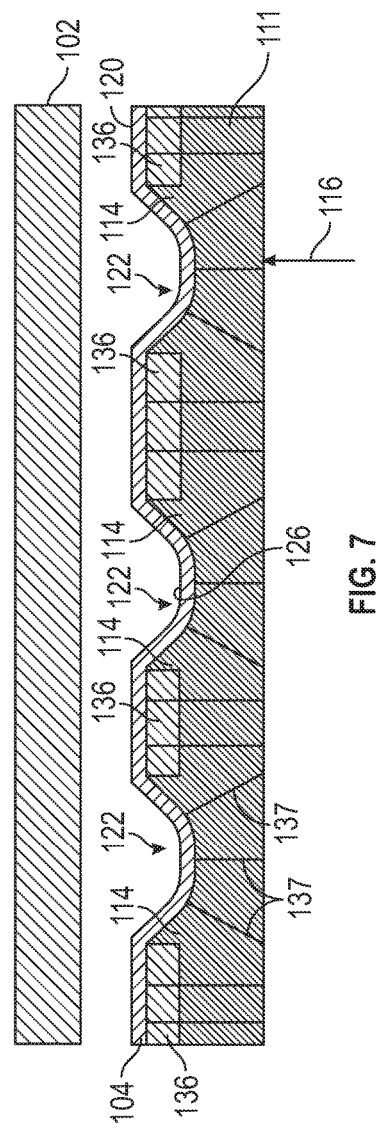
FIG. 7 is a schematic illustration of a component and a die, in accordance with an embodiment.

In an exemplary embodiment as illustrated in FIG. 7, the die 111 includes integrated heaters 136 in the raised areas 114. The die 111 also includes ports 137, which register with the depressions 122. A vacuum may be drawn through the ports 137 drawing the adjacent parts of the deformable sheet 104 into the depressions 122. The deformable sheet 104 and the component 102 are brought together under application of the force 116 and the interface areas 120 are secured by fusing under the applied heat while the vacuum is applied. In other embodiments, the deformable sheet is plastically deformed under the application of the vacuum, the vacuum is relieved, and the component 102 and deformable sheet 104 are then brought together with the deformable sheet already deformed to form the channels 126.

Figure 8:
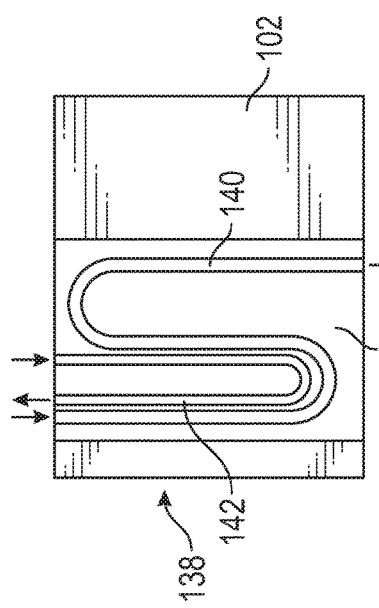
FIG. 8 is a schematic illustration of a component with vascular channels, in accordance with an embodiment.

In an exemplary embodiment as illustrated in FIG. 8, an assembly 138 of the component 102 and the deformable sheet 104 is formed with channels in multiple different flow paths 140, 142. The flow paths 140, 142 may be formed in independent networks, each with multiple paths, may have a counter-flow configuration, may carry different fluids, may carry fluids at different temperatures, may be controlled with different or alternate flow rates, and may vary in other ways. In some embodiments, areas of the assembly 138 are covered with channels of different densities to provide localized variations in heating or cooling. The flow paths 140, 142 may take any of a variety of shapes such as straight, curved, serpentine, etc.

Figure 9:
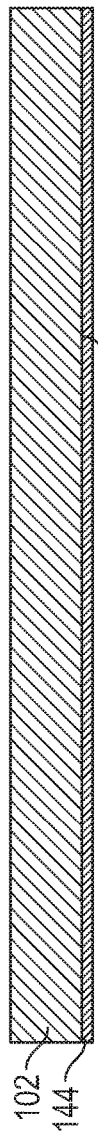
FIG. 9 is a schematic cross sectional illustration of a component, in accordance with an embodiment.
Figure 10:
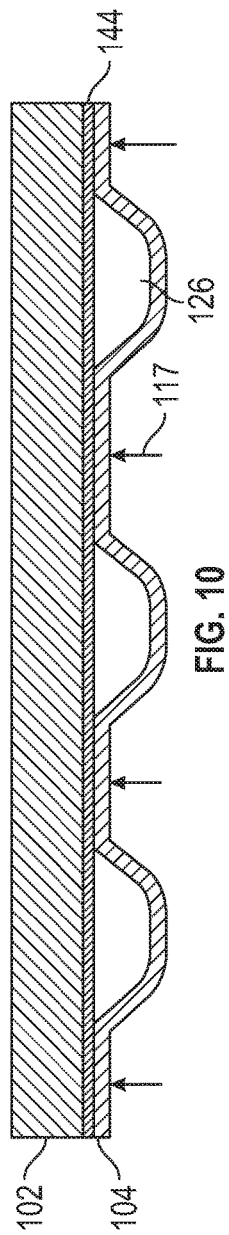
FIG. 10 is a schematic cross sectional illustration of the component of FIG. 9 with formed vascular channels, in accordance with an embodiment.

In an exemplary embodiment as illustrated in FIGS. 9-10, the component 104 is covered with an adhesive layer 144, such as by a spray applicator 146. The coverage may be consistent over the entire surface 106, or the adhesive may be applied to select areas. As shown in FIG. 10, the deformable sheet 104 may be pre-deformed and is applied against the adhesive layer 144 under an applied pressure 117. The deformable sheet 104 is secured to the component 102 by the adhesive layer 144 and the channels 126 are defined. In a number of embodiments as illustrated in FIGS. 11-12, in place of the adhesive layer 144, the surfaces 106, 108 are heated, such as by an infrared heater 147. The heater 147 is withdrawn and the pre-deformed deformable sheet 104 is brought against the component 102 under the application of the pressure 117, and the two are fused together defining the channels 126.

Figure 13:
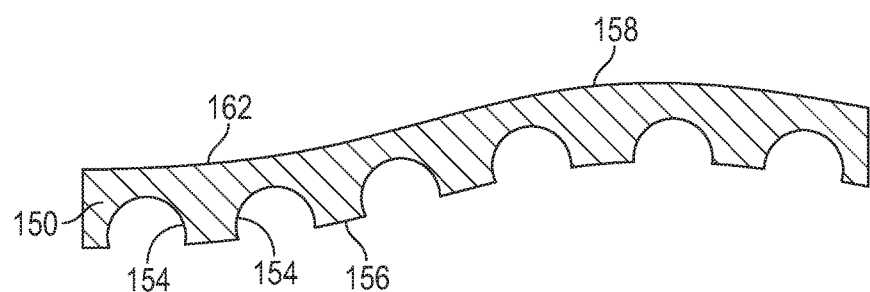
FIG. 13 is a schematic illustration of an element of a component, in accordance with an embodiment.
Figure 14:
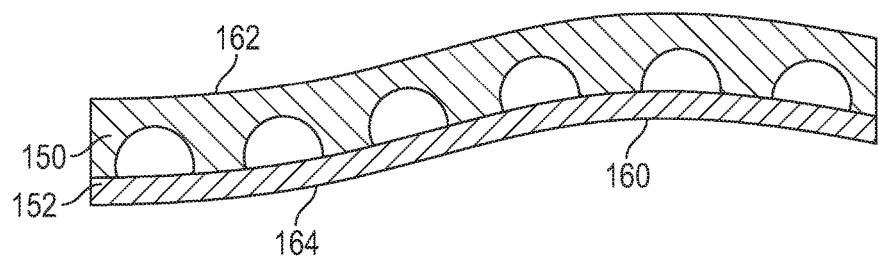
FIG. 14 is a schematic illustration of elements of the component of FIG. 13, in accordance with an embodiment.

In an exemplary embodiment as illustrated in FIGS. 13-14 an assembly is formed of two elements 150, 152. The element 150 is formed with depressions 154 between raised areas 156. The element 150 is contoured with a curved surface 158. The element 150 may be formed in a variety of ways, and in the current embodiment is formed by injection molding. The element 152 may be formed in a variety of ways. The element 152 may be a flexible sheet or may be a rigid part. In some embodiments, the element 152 is formed by injection molding. The element 152 has a contour 160 matching the contour 158, which it may be formed to have, or which it may take on when applied to the element 150. The elements 150, 152 may be brought together and secured such as with an adhesive, vibrational or ultrasonic welding, or thermally, as described above. In the current embodiment, either the surface 162 or the surface 164 may be the exposed surface, visible when assembled in its application. This is because the elements 150, 152 are formed without read-through of the channels through either surface 162, 164.

Figure 15:
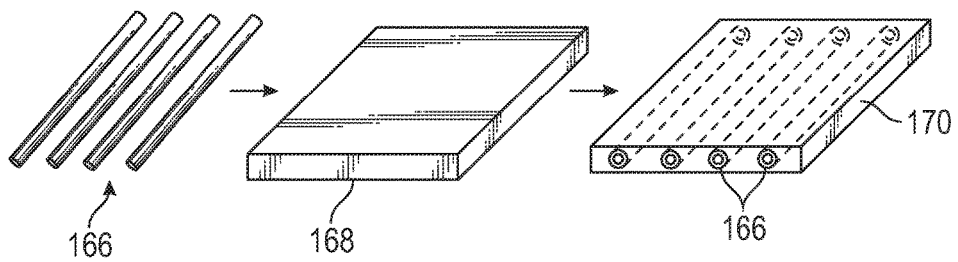
FIG. 15 is a schematic illustration of tube application to a component, in accordance with an embodiment.
Figure 16:
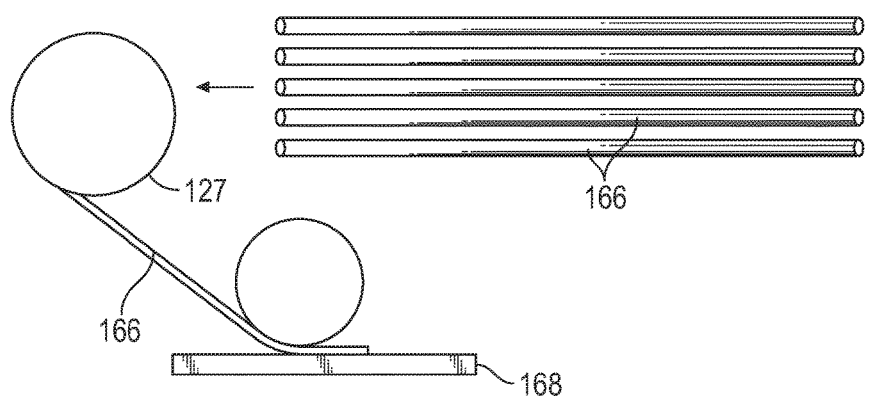
FIG. 16 is a schematic illustration of a tube application process for a component, in accordance with an embodiment.
Figure 17:
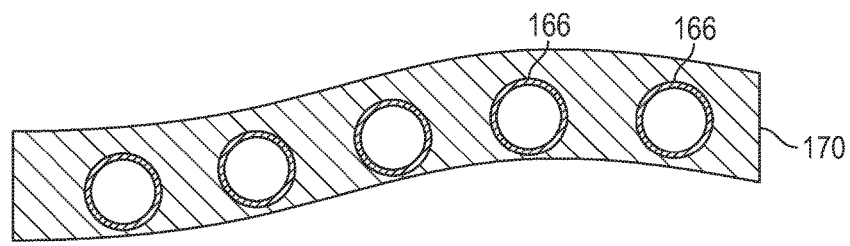
FIG. 17 is a schematic cross sectional illustration of the component of FIG. 16 with incorporated tubes, in accordance with an embodiment.

A number of embodiments involve manufacturing of products with vascular channels by the inclusion of tubes in a component. With reference to FIG. 15, a number of tubes 166 are arranged in a desired pattern for the heating or cooling effect that is needed. The tubes 166 may be of any viable size to meet the needs of the application. In a number of embodiments, the tubes 166 range from about 0.5 millimeter to about 5.0 millimeters in diameter. The tubes are laid in a mold 168 and a component 170 is molded around the tubes 166. In some embodiments as shown in FIG. 16, the tubes 166 are dispensed from a roll 172 and deposited in the mold 168. The resulting component 170, with the incorporated tubes 166 may take any desired shape, such as with nonlinear surfaces as shown in FIG. 17.

Figure 18:
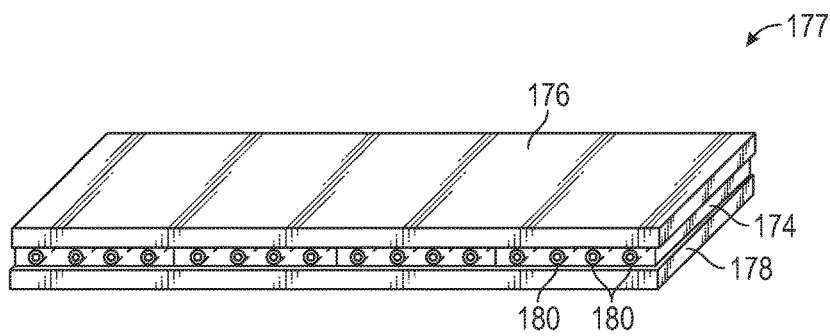
FIG. 18 is a schematic perspective illustration of a laminated component, in accordance with an embodiment.

In an exemplary embodiment as illustrated in FIG. 18, a laminated component is formed of a tube containing layer 174 disposed between a pair of external layers 176 and 178. In one example the component is a window such as the windshield of an automobile. The external layers 176 and 178 are formed of glass and the tubes 180 and the tube containing layer 174 are formed of a transparent polymer such as polyvinyl butyral, ethylene-vinyl acetate, polycarbonate, thermoplastic polyurethane, Poly(methyl methacrylate), or another polymer. The tube containing layer, conveys an index-matching material, which has an index of refraction that closely approximates that of the glass and tube containing layer 174. In the example of a windshield, which may transfer substantial radiant heat into the vehicle's cabin, a cooled fluid is circulated through the tubes 180 for cooling purposes. In other embodiments, the fluid is warmed, such as for defogging or defrosting purposes.

Figure 19:
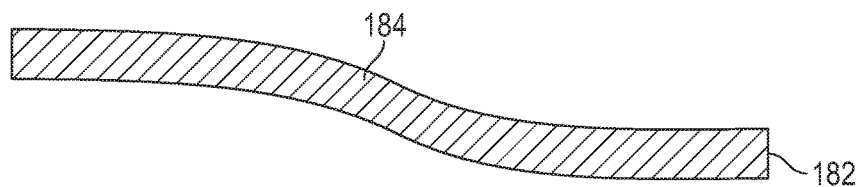
FIG. 19 is a schematic cross sectional illustration of a component, in accordance with an embodiment.
Figure 20:
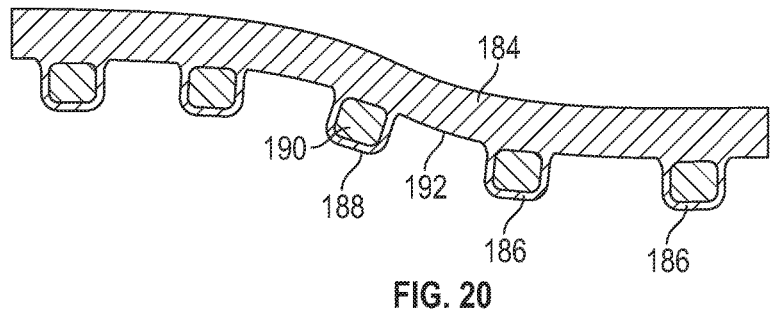
FIG. 20 is a schematic cross sectional illustration of the component of FIG. 19 with applied channel structures, in accordance with an embodiment.
Figure 21:
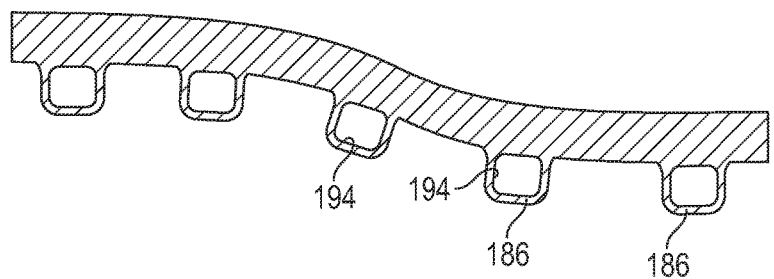
FIG. 21 is a schematic cross sectional illustration of the component of FIG. 19 with formed vascular channels, in accordance with an embodiment.

A number of embodiments involve manufacturing of products with vascular channels through the use of sacrificial materials. Using sacrificial materials enables forming channels with very small diameters. For example, diameters as small as 100 micrometers may be formed. With reference to FIG. 19, in an exemplary embodiment a component 182 is formed through various methods, such as through injection molding. The component 182 may be formed in any shape, and has a surface 184, which may be an appearance surface (class A surface), that is visible when the component 182 is assembled into a product. As shown in FIG. 20, channel structures 186 are created with stable outer wall 188 and sacrificial core 190. The channel structures 186 are placed and bonded, or formed onto a surface 192. The surface 192 is located in an unexposed area when the component 182 is assembled into a product. In one example, the channel structures 186 are printed onto the surface 192 encapsulating sacrificial fibers as the sacrificial core 190. The sacrificial core 190 is applied to the surface 192 as a sacrificial scaffold, and the wall 188 is deposited in layers and built up to a structurally sufficient thickness for the pressures that will be applied. As shown in FIG. 21, the sacrificial core 190 is depleted and the walls 188 form channels 194. The material of the sacrificial core may be removed thermal, chemical, electrical, ultraviolet, or other action depending on the specific material used. In one example, the sacrificial cores 190 are formed from catalyst impregnated polylactide and removed by vaporization at elevated temperature.

Figure 22:
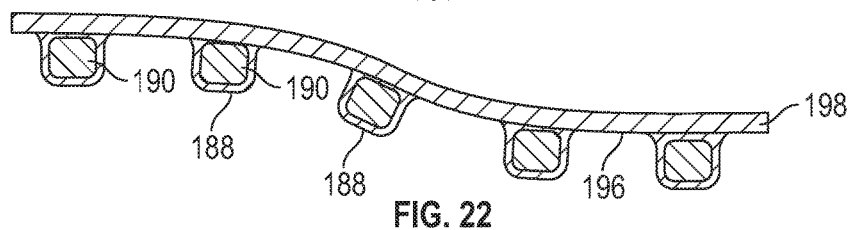
FIG. 22 is a schematic cross sectional illustration of a mold with applied channel structures, in accordance with an embodiment.
Figure 23:
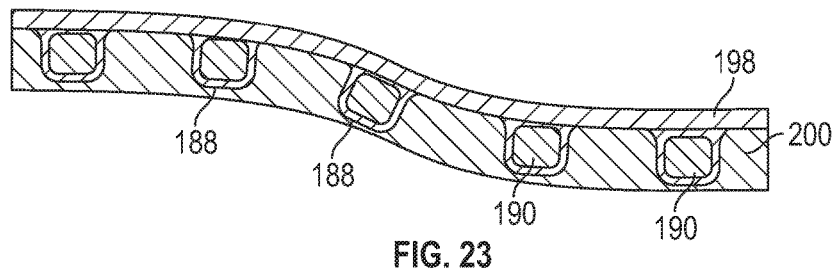
FIG. 23 is a schematic cross sectional illustration of a component added to the channel structures and mold of FIG. 22, in accordance with an embodiment.
Figure 24:
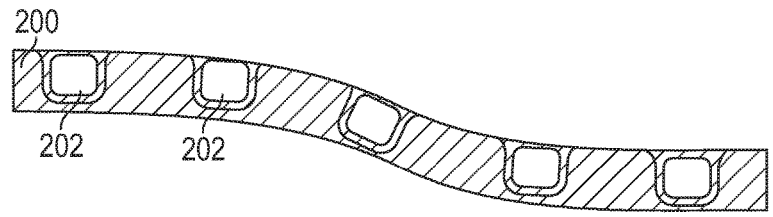
FIG. 24 is a schematic cross sectional illustration of the component of FIG. 23 with formed vascular channels, in accordance with an embodiment.

In an exemplary embodiment as illustrated in FIG. 22, the walls 188, are printed onto a surface 196 of a mold 198 encapsulating the sacrificial cores 190. As shown in FIG. 23, a component 200 is formed on the mold 198, such as through injection molding. The component 200 is formed around the sacrificial cores 190 and the walls 188. As shown in FIG. 24, the sacrificial cores 190 are depleted and channels 202 are formed in the component 200. The walls 188 may be formed from the same material as the component 200 and become an integral part thereof.

Figure 25:
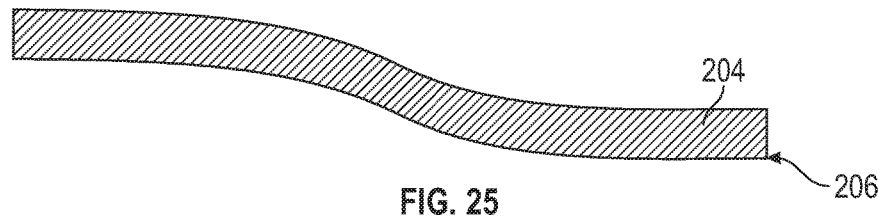
FIG. 25 is a schematic cross sectional illustration of an element of a component, in accordance with an embodiment.
Figure 26:
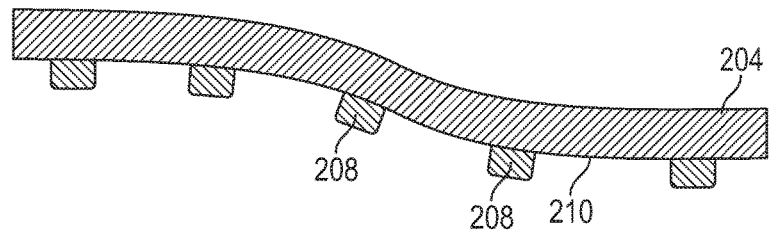
FIG. 26 is a schematic cross sectional illustration of the element of FIG. 25 with applied tracks of sacrificial material, in accordance with an embodiment.
Figure 27:
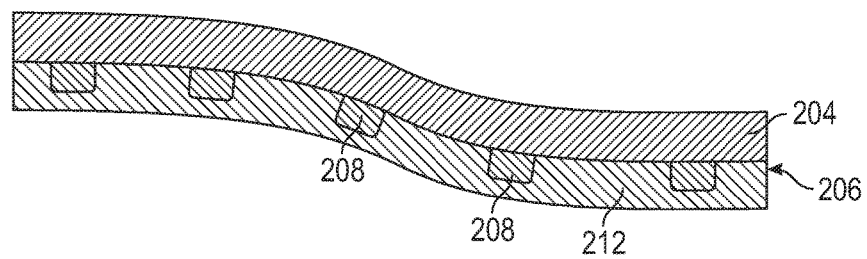
FIG. 27 is a schematic cross sectional illustration of the element of FIG. 25 with applied tracks of sacrificial material and another element forming a component, in accordance with an embodiment.
Figure 28:
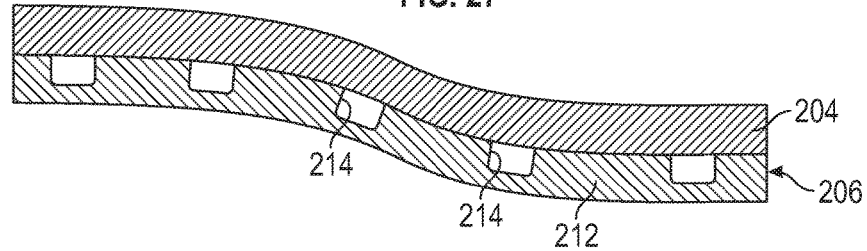
FIG. 28 is a schematic cross sectional illustration of the component of FIG. 27 with formed vascular channels, in accordance with an embodiment.

In an exemplary embodiment as illustrated in FIG. 25 an element 204 of a component 206 is formed from a variety of methods. In this example the element 204 is formed by injection molding. A number of tracks 208 of sacrificial material are printed onto a surface 210 of the element 204 as shown in FIG. 26. Another element 212 of the component 206 is formed on the element 204 overmolded on the tracks 208 as shown in FIG. 27. In the current example, the element 212 is formed by injection molding. The tracks 208 of sacrificial material are removed as shown in FIG. 28, such as by thermal, chemical, electrical, ultraviolet, or other action, depending on the specific material used. Channels 214 are formed in the component 206 by removal of the tracks 208 of sacrificial material.

Figure 29:
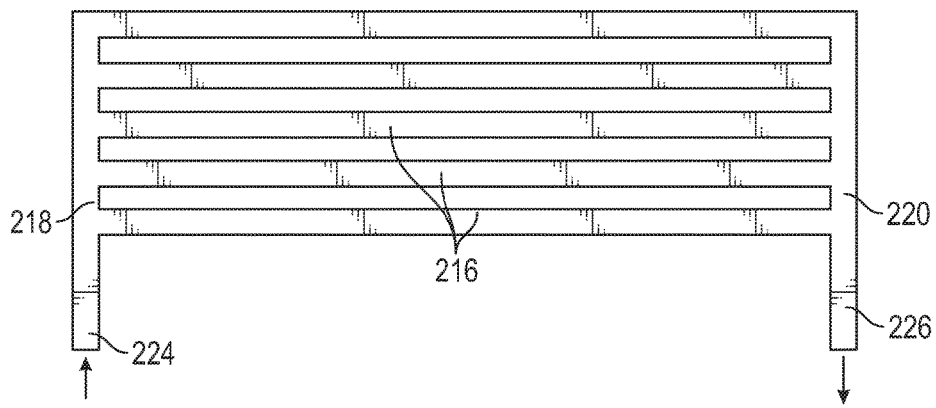
FIG. 29 is a schematic illustration of a sacrificial material formed into tracks connected with sacrificial manifolds, in accordance with an embodiment.
Figure 30:
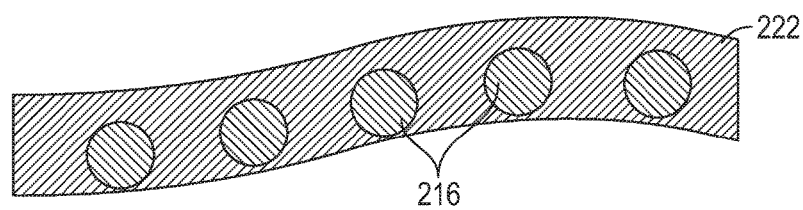
FIG. 30 is a schematic cross sectional illustration of the tracks of FIG. 29 with a formed component.
Figure 31:
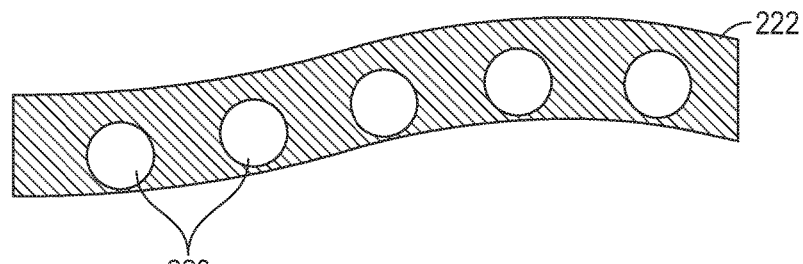
FIG. 31 is a schematic cross sectional illustration of the component of FIG. 30 with formed vascular channels, in accordance with an embodiment.

A number of embodiments involve manufacturing of products with manifolds to connect the vascular channels through the use of sacrificial materials. In an exemplary embodiment as shown in FIG. 29 a number of tracks 216 of sacrificial material are formed through any of the methods described above including injection molding, 3D printing, and other methods. The tracks 216 are connected with a pair of manifolds 218 and 220. The manifold 218 connects with one end of each of the tracks 216 and the manifold 220 connects with the opposite ends of each of the tracks 216. In this embodiment, the tracks 216 and the manifolds 218, 220 are formed into a component 222 as shown in FIG. 30 The component 222 may be formed by any of the methods described above, including injection molding. The ends 224, 226 of the manifolds 218, 220 respectively, are left accessible for connection with a fluid circulation system. The component is treated to deplete the sacrificial material of the tracks 216, such as through thermal, chemical, electrical, ultraviolet, or other action. Removal of the sacrificial material tracks 216 leaves channels 228 in the component 222 as shown in FIG. 31.

Figure 32:
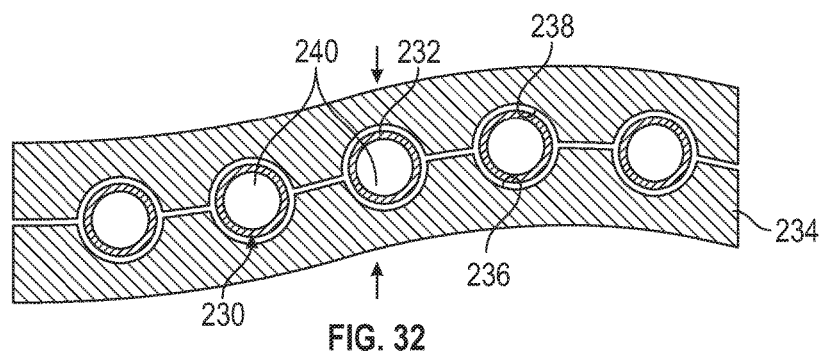
FIG. 32 is a schematic cross sectional illustration of a blow molding operation, in accordance with an embodiment.
Figure 33:
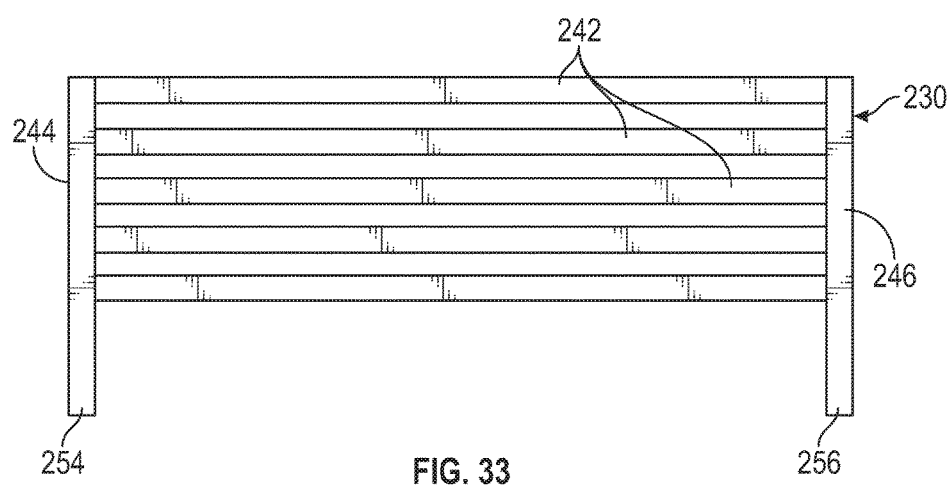
FIG. 33 is a schematic cross sectional illustration of a vascular channel preform, in accordance with an embodiment.
Figure 34:
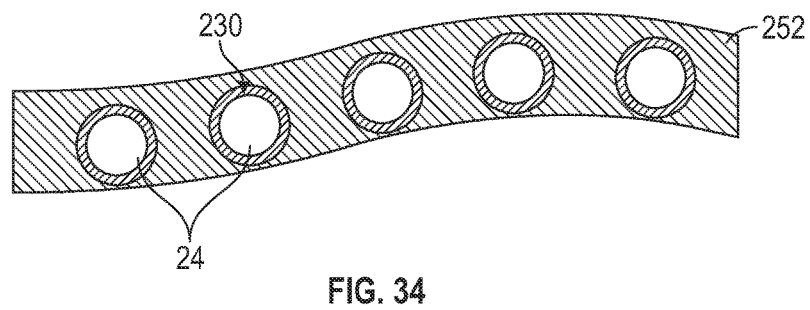
FIG. 34 is a schematic cross sectional illustration of the preform of FIG. 33 incorporated into a component, in accordance with an embodiment.

A number of embodiments involve manufacturing of products with manifolds to connect the vascular channels by preforming manifolds. As shown in FIG. 32 a network 230 is formed through any of the methods described above including injection molding, 3D printing, and other methods. In an exemplary embodiment, the network 230 is formed by blow molding. A heated polymer material 232 is injected into a mold 234 that has the network configuration formed in its interior surfaces 236, 238. Air is blown into the mold 234 forming voids 240 in the polymer material 232. The mold 234 is opened and the network 230 is extracted and is configured as shown in FIG. 33. The network 230 includes a number of tubular elements 242 connected with a pair of manifolds 244 and 246. The network 230 is closed except at the ends 248, 250 of the manifolds 244, 246 respectively. The manifold 244 connects with one end of each of the tubular elements 242 and the manifold 246 connects with the opposite ends of each of the tubular elements 242. The tubular elements 242 and the manifolds 244, 246 are formed into a component 252 as shown in FIG. 34. The component 252 may be formed by any of the methods described above, including injection molding. The ends 254, 256 of the manifolds 244, 246 respectively, are left accessible for connection with a fluid circulation system. The network 230 may be formed in any configuration needed for the circulation of a fluid or multiple fluids through the component 252.

In various examples the components descried above are formed of materials such as metals, polymers and/or compounds. In various examples a metal such as steel, aluminum alloy, magnesium alloys, or others. In various examples a polymer such as a thermoset or thermoplastic is used. Example polymers include, but are not limited to: Acrylonitrile butadiene styrene (ABS), Polymethyl Methacrylate (PMMA), Celluloid, Cellulose acetate, Cycloolefin Copolymer (COC), Benzoxazine, Bis-Maleimides (BMI), Cyanate esters, Epoxy, Ethylene-Vinyl Acetate (EVA), Ethylene vinyl alcohol (EVOH), Fluoroplastics (including PTFE, FEP, PFA, CTFE, ECTFE, ETFE), Phenioc (PF), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), Polycaprolactone (PCL), Polychlorotrifluoroethylene (PCTFE), Polyethylene terephthalate (PET), Polycyclohexylene dimethylene terephthalate (PCT), Polycarbonate (PC), Polyhydroxyalkanoates (PHAs), Polyketone (PK), Polyester, Polyetheretherketone (PEEK), Polyetherketoneketone (PEKK), Polyetherimide (PEI), Polyethersulfone (PES), Polysulfone, Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polystyrene (PS), Polysulfone (PSU), Polytrimethylene terephthalate (PTT), Polyurethane (PU), Polyvinyl acetate (PVA), Polyvinyl chloride (PVC), Polyvinylidene chloride (PVDC), Styrene-acrylonitrile (SAN), polycarbonate+acrylonitrile butadiene styrene mix (ABS+PC), Polypropylene (PP), Polyethylene (PE), unsaturated Polyester, Polyeurethane (PUR), Vinyl ester, Silcone, or combinations or blends in any amount thereof, or may be another type. In various examples, compounds with a fibrous material incorporated into a matrix material of a polymer is used. Fibers may be carbon, glass, para-aramid, meta-aramid, basalt, Polyethylene, combinations thereof, or another material. The components are formed through any process appropriate for the materials selected.

Figure 35:
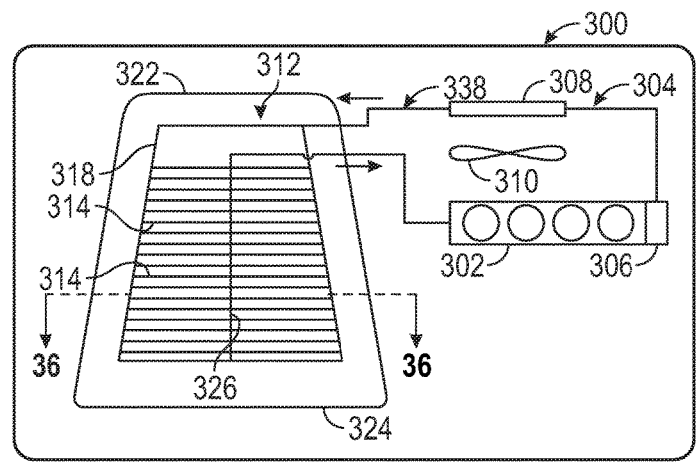
FIG. 35 is a schematic illustration of a vehicle vascular channel fluid system, in accordance with an embodiment.

In a number of embodiments as illustrated in FIG. 35, a vehicle 300 includes an engine 302 as an exemplary vehicle system. A cooling system 304 circulates coolant to extract heat from the engine 302. The cooling system 304 includes a radiator 308 and a fan 310 to help draw air through the radiator 308 to extract heat as the coolant is circulated by a pump 306. A network 312 of vascular channels 314 is incorporated in the hood 316 of the vehicle 300. It will be appreciated that the hood 316 closes a compartment of the vehicle 300 that contains the engine 302 and is but one example of a body panel of the vehicle 300 that may include vascular channels 314. The vascular channels 314 may be formed through a method as described above, or by another method. The network 312 includes a pair of inlet manifolds 318 and 320 that generally extend in a direction from a front 322 of the hood 316 to a rear 324 thereof. The inlet manifolds 318, 320 distribute fluid to the vascular channels 314. An outlet manifold 326 extends in a direction that is generally from the rear 324 of the hood 316 to the front 322, and is positioned generally in the center of the hood 316. Accordingly, flow through the network is generally from the lateral sides toward the center of the hood 316. It will be appreciated that the network 312 is shown in FIG. 35 for descriptive purposes but in application will be contained in the hood 316 and not visible from the exterior.

Figure 36:
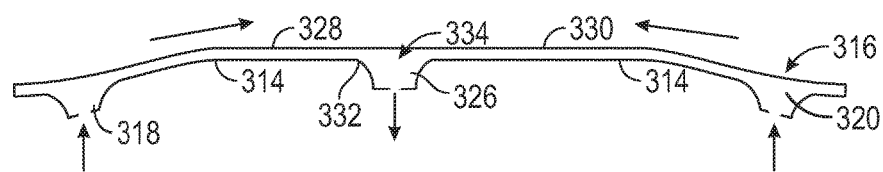
FIG. 36 Is a schematic cross sectional illustration taken generally through the line 36-36 of FIG. 35.

With additional reference to FIG. 36, the hood 316 is formed from an outer layer 328, which includes the class A surface 330, and an inner layer 332. A contiguous space 334 is defined between the inner and outer layers 328, 332, which forms the network 312, including the vascular channels 314 and the manifolds 318, 320 and 326. The layers 328 and 332 may be formed from a variety of materials as described above and in the current embodiments are formed of a stamped sheet metal, such as steel. The vascular channels 314 may range in size in this embodiment between 0.5 to 5.0 millimeters in diameter. In other embodiments, the size of the vascular channels will vary depending on the material used, the manufacturing process selected and whether a need exists to avoid read-through on the surface 330. For example, when the network 312 is in a component that is not visible, such as at the underbody of the vehicle 300, the diameter of the vascular channels may be larger.

With the network 312 formed in the hood 316, the fluid, which in this case is engine coolant, is circulated by the pump 306 through the engine 302 and the radiator 308. From the radiator, the coolant moves through the inlet manifolds 318, 320, the vascular channels 314 and the outlet manifold 326, from which it is routed back to the engine 302 by the fluid circuit 338. Inclusion of the network 312 provides cooling by heat dissipation through the hood 316, which allows reduction in size of the radiator 308, saving cost and weight. In some applications, the network 312 is sized to allow elimination of the radiator 308. For example, the network 312 may be extended to additional components of the vehicle 300 to provide the necessary cooling capacity. In other embodiments, the radiator 308 is a condenser of an air conditioning system and the pump 306 is a compressor to move fluid through the fluid circuit and the network 312. Such a system will also include an evaporator (not shown), to provide cool air the cabin of the vehicle 300. Heat dissipated through the hood 316 allows reduction in the condenser's size.

Figure 37:
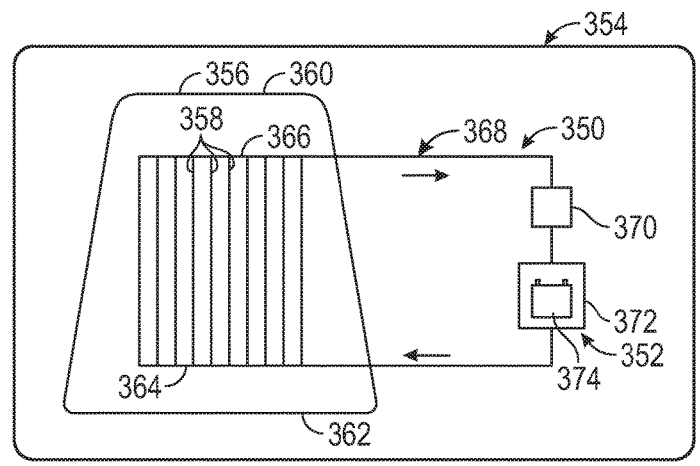
FIG. 37 is a schematic illustration of a vehicle vascular channel fluid system, in accordance with an embodiment.

In a number of embodiments as illustrated in FIG. 37, a vascular channel system 350 is provided for cooling a battery system 352 of a vehicle 354 as another exemplary vehicle system. The vehicle 354 includes an exterior component which in this example is a roof panel 356. The roof panel may be formed from a variety of materials as described above and in the current example is a fiber reinforced composite. A number of vascular channels 358 are formed in the roof panel 356, such as through a method described above. The vascular channels 358 extend in a direction from a front 360 to a rear 362 of the roof panel 356. An inlet manifold 364 is connected with the vascular channels 358 to supply fluid thereto, and an outlet manifold 366 is also connected with the vascular channels 358 to receive fluid therefrom. A fluid circuit 358 includes the manifolds 364, 366 and the vascular channels 358. A pump 370 is connected in the fluid circuit 368 to move fluid through a coolant jacket 372 of the battery system 352 to collect heat from the battery pack 374. The fluid is circulated through the inlet manifold 364, the vascular channels 358 and the outlet manifold 366, dissipating heat through the roof panel 356. The fluid returns to the pump 370 completing the circuit. The vascular channel system 350 provides cooling for the battery system 352 removing generated heat and in the current embodiment obviates the need for other battery cooling systems.

Figure 38:
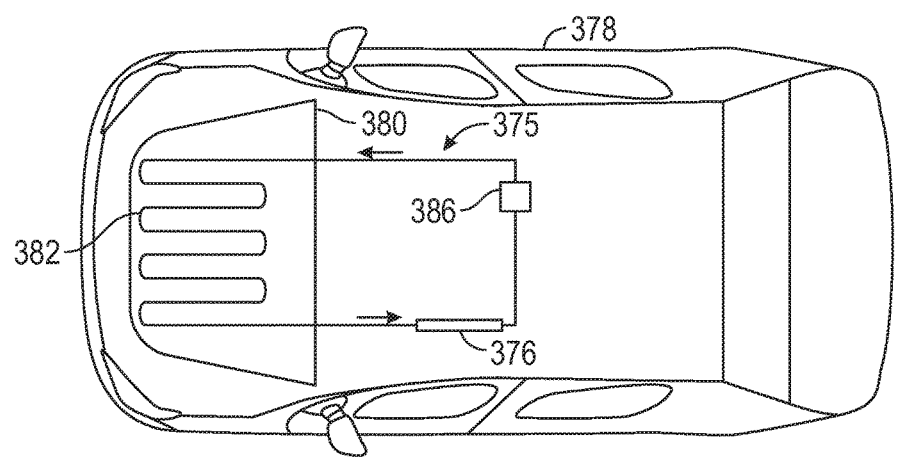
FIG. 38 is a schematic illustration of a vehicle vascular channel fluid system, in accordance with an embodiment.

In a number of embodiments as illustrated in FIG. 38, a vascular channel system 375 is provided for cooling a gearbox 376 of a vehicle 378, as an additional exemplary vehicle system. The gearbox 376 may be a transmission, a differential, of another power transmission device where heat removal is desired. The vehicle 378 includes an exterior component which in this example is an underbody panel 380. The underbody panel 380 may be formed from a variety of materials as described above and in the current example is formed of stamped metal. A vascular channel 382 is formed in the underbody panel 380, such as through stamping or another method described above. In this example the vascular channel 382 is formed in a serpentine shape. A fluid circuit 384 includes the vascular channel 382 and a pump 386 to move fluid through the gearbox 372 to collect heat therefrom. The fluid may be a lubricant used in the gearbox 372. The fluid is circulated through the vascular channel 382 dissipating heat through the underbody panel 380. The fluid returns to the gearbox 376 completing the circuit. The vascular channel system 375 provides cooling for the gearbox 376 removing generated heat and in the current embodiment obviates the need for other cooling systems.

Figure 39:
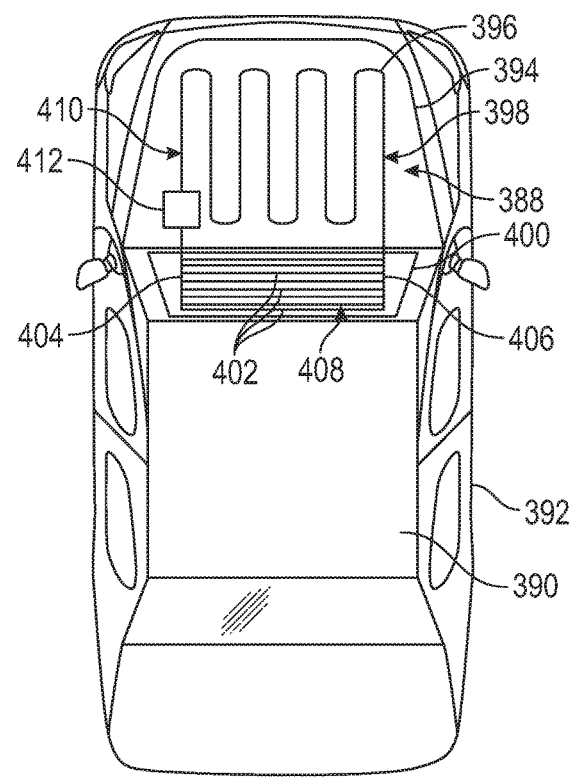
FIG. 39 is a schematic illustration of a vehicle vascular channel fluid system, in accordance with an embodiment.

In a number of embodiments as illustrated in FIG. 39, a vascular channel system 388 is provided for cooling a cabin 390 of a vehicle 392. The vehicle 392 includes an exterior component, which in this example is a hood 394. The hood 394 may be formed from a variety of materials as described above and in the current example is formed of stamped metal. A vascular channel 396 is formed in the hood 394, such as through a method described above, in a network 398 with a serpentine shape. The vehicle 392 also includes an interior component which in this example is a dashboard 400. The dashboard 400 may be formed from various materials as described above, and in the current example is formed of a polymer by injection molding. The dashboard 400 includes a number of vascular channels 402, each connected with an inlet manifold 404 and an outlet manifold 406 to form a network 408. A fluid circuit 410 includes the network 398, the network 408 and a pump 412. In this exemplary embodiment, the pump 412 moves a fluid through the fluid circuit 410 and through the networks 398, 408 to collect heat from the dashboard 400 and to dissipate heat through the hood 394. Removing heat from the dashboard 400 through the vascular channel system 388 reduces the radiative heat load in the cabin 390 increasing the comfort level of occupants by providing a cooling effect.

Through the foregoing structures, systems and methods, vascular channels provide an efficient form of heat management. While certain exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A heat management system comprising:
   a component with first vascular channels incorporated in a network within the component, the component configured as an exterior panel of a vehicle;
   a cabin defined by the vehicle and configured to carry occupants;
   an interior component defining in-part, an interior of the cabin;
   second vascular channels incorporated in a second network in the interior component;
   a fluid circuit connected with the first and second vascular channels and configured to circulate a heat-transfer fluid through the component;
   a pump configured to circulate the heat-collecting fluid through the network of the exterior panel and through the second network of the interior component, wherein heat is collected from the interior component and is dissipated through the exterior panel.

2. The system of claim 1 wherein the component includes an outer layer with a class A surface and includes an inner layer wherein a contiguous space is defined between the inner and outer layers which forms the network, including the first vascular channels.

3. The system of claim 1 comprising:
   a vehicle system;
   a heat exchanger, wherein the heat-transfer fluid circuit includes the heat exchanger and the vehicle system; and
   a second pump configured to circulate the heat-transfer fluid through the vehicle system, the heat exchanger and the component, to cool the vehicle system.

4. The system of claim 1 wherein the component comprises a vehicle hood.

5. The system of claim 1 wherein the component comprises a vehicle roof.

6. The system of claim 1 wherein the first and second vascular channels have a diameter between 0.5 millimeter and 5.0 millimeters.

7. The system of claim 1 wherein the first and second vascular channels comprise tubes embedded in the component.

8. The system of claim 1 wherein the network comprises a manifold connected with the first and second vascular channels.

9. The system of claim 1 wherein the component comprises a fiber material incorporated in a polymer matrix.

10. A method of thermal management comprising:
incorporating vascular channels in a network within a vehicle hood, wherein the vehicle hood comprises an exterior panel;
assembling the vehicle hood as a part of a manufactured product;
generating heat in a system of the manufactured product;
connecting a fluid circuit with the vascular channels and the system; and
circulating a fluid through the system and through the vehicle hood, wherein the fluid collects heat from the system and dissipates heat through the vehicle hood.

11. The method of claim 10 comprising:
configuring the manufactured product as a vehicle; and
configuring the system to provide a function of the vehicle that generates heat.

12. The method of claim 11 comprising:
connecting a heat exchanger in the fluid circuit; and
circulating the fluid through the heat exchanger and through the network.

13. The method of claim 10 comprising forming the vascular channels with a diameter between 0.5 millimeter and 5.0 millimeters.

14. The method of claim 10 comprising:
forming the vascular channels as tubes; and
embedding the tubes in the component.

15. The method of claim 10 comprising:
connecting a manifold with the vascular channels; and
incorporating the manifold into the component.

16. The method of claim 10 comprising forming the component of a fiber material incorporated in a polymer matrix.

17. A heat management system for a vehicle with a vehicle system that generates heat, the heat management system comprising:
a component of the vehicle, wherein the component defines an exterior panel of the vehicle;
a fluid circuit configured to circulate a heat-transfer fluid;
a vascular channel in the component and connected with the fluid circuit, wherein the vascular channel is configured to channel the fluid through the component; and
a radiator carried by the vehicle and configured to cool the vehicle system, wherein the fluid circuit includes the radiator;
wherein the fluid circuit is configured to circulate the heat-transfer fluid through the vehicle system to collect heat, through the radiator to dissipate heat from the vehicle system to atmosphere, and through the exterior panel to dissipate additional heat from the vehicle system to atmosphere supplementing the radiator.

* * * * *